United States Patent [19]

Fortune

[11] 4,143,812
[45] Mar. 13, 1979

[54] THERMOSENSITIVE SAFETY VALVE

[76] Inventor: Jeffrey L. Fortune, 3901 40th St. S., St. Petersburg, Fla. 33711

[21] Appl. No.: 838,869

[22] Filed: Oct. 3, 1977

[51] Int. Cl.² ............................................. G05D 23/10
[52] U.S. Cl. ................................. 236/48 R; 137/457; 251/121; 236/93 R; 236/101 E
[58] Field of Search ............... 236/93 R, 101 E, 48 R; 137/457, 468, 470; 251/303, 121, 123

[56] References Cited

U.S. PATENT DOCUMENTS

| | | | |
|---|---|---|---|
| 857,452 | 6/1907 | Farmer | 236/93 X |
| 1,449,675 | 3/1923 | Heiser | 236/93 |
| 1,608,205 | 11/1926 | Francke | 236/93 |
| 1,888,225 | 11/1932 | Hetherington | 236/93 |
| 2,805,660 | 9/1957 | Coleman, Jr. et al. | 236/101 E X |
| 3,032,058 | 5/1962 | Weese | 236/93 X |
| 4,047,695 | 9/1977 | Cleveland et al. | 251/122 |

*Primary Examiner*—William F. O'Dea
*Assistant Examiner*—William E. Tapolcai, Jr.

[57] ABSTRACT

There is disclosed an apparatus and method for a thermosensitive safety valve to restrict a supply of fluid in a fluid delivery system when the temperature of the fluid reaches a predetermined temperature. A bimetal reed is utilized in which its unattached portion flexes outward from its normal, non-flexed position when the fluid temperature reaches a predetermined value into a flexed intermediate position with the mainstream of the fluid flow subsequently providing the pressing force for placing the unattached portion in a fluid restricting position. Furthermore, the reed may be reinstated in at least its flexed intermediate position so as to allow for subsequent fluid flow when the temperature of the same has been adjusted to a value less than the predetermined value of temperature.

12 Claims, 5 Drawing Figures

THERMOSENSITIVE SAFETY VALVE

FIELD OF THE INVENTION

This invention relates to safety control valve utilized with fluid outlets where the temperature of the water supply is regulated. More specifically, the present invention relates to a safety control valve to be used with fluid outlets, such as showers, baths, sinks, rinse and wash tanks.

DESCRIPTION OF THE PRIOR ART

In general, a fluid which is discharged from an outlet which may come in contact with human beings is regulated with respect to temperature by means of valves connected respectively to the hot fluid supply and cold fluid supply, and the discharged fluid temperature is the resultant of the quantities of hot and cold fluid at their respective temperatures. The process of regulating fluid discharge temperature by means of mixing valves is an impercise process of adjustments leading to the desired outlet temperature. In the process of this adjustment it frequently occurs that a fluid temperature above the human comfort level is allowed to be discharged from the outlet and cause discomfort to the human being or even scalding. It is the purpose of this invention to prevent the discharge of fluid at temperatures sufficiently hot to cause discomfort and scalding.

One of the most common features of fluid delivering systems is the variation in temperatures of the hot and cold fluids respectively because of loss or gain of heat in the process of flowing through pipes and/or variations in quantity of hot and cold fluids being mixed as a result of changes in flow brought about by other demands which may be placed upon the fluid delivering system. These uncontrolled variations which may result in significant fluctuations in the discharged fluid temperature are frequent causes of discomfort and scalding even after the discharged fluid temperature has been adjusted. Some of the most prevelant examples of fluid temperature and flow variations are encountered when people are in motels, apartments, hospitals, dormitories, public baths, etc. where the temperature of the water delivered to a particular outlet may suddenly increase as the result of a person flushing a toilet or turning on another water consuming device in the system. Even at times when the water temperature variation is not sufficient to cause scalding, it is sufficiently high to cause discomfort and a physical reaction on the part of the user to remove his body from the flow. Such sudden or violent motions are a frequent source of injuries from slips and falls within bath enclosures.

Safety shower heads, temperature sensitive water control valves, and other devices have been proposed in the past and a variety of such devices have been described in the prior art.

Each of the various devices which have been studied in the process of development of this invention has one or more of the following drawbacks.

(1) Response is too slow to sufficiently protect the user from the temperature fluctuation.

(2) The devices are too costly to manufacture and thus cannot be considered for wide application.

(3) The installation of some devices requires considerable alteration of the fluid supply system and thus the cost of installation becomes prohibitive.

(4) The nature of the devices does not permit a retrofit to existing fluid supply systems.

(5) Some do not permit the reactivation of the fluid discharge system without a long period of wait after the safety control has cutoff the flow.

(6) Some of these devices only divert the flow of fluid thus not totally eliminating the possibility of injury from the fluid which, while redirected, may still contact some portions of the body.

SUMMARY OF THE INVENTION

The present invention is directed toward a thermosensitive safety valve for restricting a supply of fluid, such valve comprising casing means having formed therein a duct with the duct having an upstream fluid inlet and a downstream fluid outlet. The casing means has an interiorly disposed partition wall interposed within the duct to define an upstream cavity and a downstream cavity. A passage is formed within the partition wall for fluid transfer between the upstream cavity to the downstream cavity. A thermoresponsive reed means is position in the upstream cavity and includes an attached portion and an unattached portion disposed upstream relative to the attached portion. The thermoresponsive reed means has a non-flexed normal position with the unattached portion of the same disposed in non-interrupting fluid position when the temperature of the fluid is below a predetermined value. Additionally, the reed means has a flexed intermediate position with the unattached position of the same being at least partially disposed within the mainstream of fluid flow upon the temperature of the fluid rising to the predetermined value. Additionally, the thermoresponsive reed means has a fluid restricting position with the unattached portion of the same disposed in partially sealing engagement with the passage of the partition wall upon the interaction of the unattached portion with the mainstream of fluid flow.

The present invention is also directed to a method of restricting a supply of fluid in a fluid delivery system for the safety of the user of the same when the temperature rises to a predetermined value. The method comprises the steps of flowing a stream of fluid through a fluid delivery system, positioning therein a thermoresponsive reed means which is disposed in a non-interrupting fluid position when the temperature of the fluid is below a predetermined value. The next step is the flexing of the reed means into a flexed intermediate position of interacting with the stream of fluid flow upon the temperature of the fluid reaching the predetermined value. The next step is the engagement of the reed means by the mainstream of fluid flow to restrict the fluid flow. Subsequently, the pressure of the fluid flow is decreased to reinstate the reed means to at least the flexed intermediate position so as to allow another try at obtaining fluid flow through the valve at a temperature less than the predetermined value.

A primary object of the present invention is to provide a thermosensitive safety valve applicable to a broad range of fluid delivery systems wherein the drawbacks of the prior art devices previously described are eliminated.

Yet another object of the present invention is to provide a thermosensitive safety valve to provide for the restriction of fluid flow when the temperature of the same reaches or exceeds a predetermined value.

Yet another object of the present invention is to provide a thermosensitive safety valve to permit the rapid reestablishment of fluid flow through the delivery system after the flow is restricted. It has been earlier stated that one of the problems inherent in the prior art was that a considerable delay was required before the fluid discharge device could be reactivated. The present invention permits the fluid flow to be reinstituted as quickly as the user is capable of cutting off the fluid supply at the mixing valves or its equivalent and then reopening the same source. This object is accomplished because the actual flow restriction is not held in the restricted position by a thermostatic mechanism, such as in the prior art, which physically blocks the flow as the result of its displacement, but rather the flow in the present invention is restricted by the movable bimetal reed entering the mainstream of fluid flow and held against the orifice of the passage only by the fluid pressure. The same will be reinstated once the pressure is decreased. The flow remains impeded or restrained as a result of the fluid pressure until the pressure is sufficiently reduced where the natural flex of the bimetal reed overcomes the pressure of the fluid so as to allow the reed to move away from the orifice and therefore allow immediate discharge, without manual intervention, of the water upstream of the invention. As the fluid mixing valves are slowly reopened to permit the flow through the invention, the fluid will simply flow through the valve during the low flow rate period as the valve are being opened, and assuming that the fluid temperature has been adjusted sufficiently downward, the valve will remain open to permit unimpeded flow. If in fact, the fluid temperature has not been readjusted sufficiently downward, the valve will again immediately restrict the fluid flow before it can cause injury or discomfort.

Yet another object of the present invention is to provide a thermosensitive safety valve to minimize the possibility of performance changes as a result of mineral scale build up. More specifically, the invention comprises only one moving part during the operation, and this part comprises a thin reed of bimetal composition which continuously flexes so as to create an environment in which is is essentially impossible for scales to adhere to the same.

Yet another object of the present invention is to provide a thermosensitive safety valve which encompasses two adjustment features within the same to broaden its applicability in a variety of uses. These adjustments are respectively the adjustment of the temperature which the valve cuts off flow and secondly the adjustment to provide a means to regulate the maximum amount of fluid flowing through the valve so that the device may effectively perform a fluid volume conservation function.

It is a further object of the present invention to provide a thermosensitive safety valve which can be easily installed by an untrained user and when it is installed be capable of providing satisfactory performance for an extended period.

DESCRIPTION OF THE DRAWINGS

Further objects and advantages of the present invention will become apparent as the following description proceeds, taken in conjunction with the accompanying drawings in which.

DESCRIPTION OF THE PREFERRED EMBODIMENT

Figure 1:
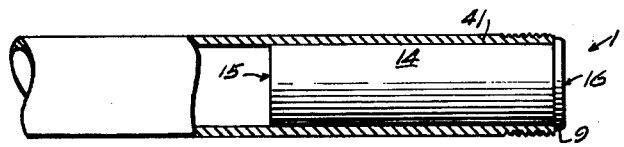
FIG. 1 is a cutaway fragmentary view of the valve of the present invention situated within a pipe fitting.

A thermosensitive safety valve, generally indicated as 1 in FIG. 1, is disclosed to be utilized as an integral part of a conventional fluid delivery system having hot water, and more particularly the thermosensitive safety valve has special utility when used in combination with shower heads. Additionally, it is contemplated that the present invention will be utilized with a temperature measuring and display device of my U.S. Pat. No. 4,030,360. The thermosensitive valve 1 is generally located upstream of a discharge outlet, such as a shower nozzle (not shown), and downstream from the fluid mixing valves for mixing cold and hot water. The valve 1 comprises a substantially elongated casing means 14, ideally, but not necessarily, molded of a plastic or like material, having an inlet 15 and an outlet in 16. The outlet in 16 includes a flange 9 to facilitate positioning of the valve 1 within the fluid delivery system and to provide a tight seal between the piping of the fluid delivery system and the valve 1. Ideally, as one means of mounting valve 1 within a fluid delivery system, the valve 1 can be made to slip within a pipe fitting 41, as shown in FIG. 1. Preferably, pipe fitting 41 is threaded to threadingly receive a second pipe fitting (not shown). Flange 9 is dimensioned so as to allow this second fitting to slip thereover.

Figure 2:
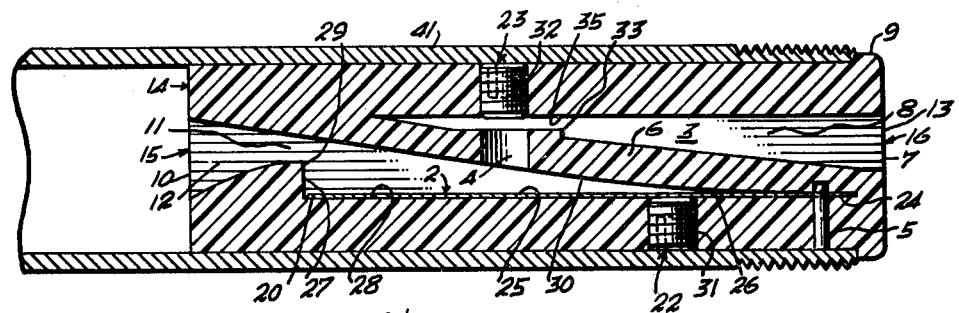
FIG. 2 is a cross-sectional view of the valve of the present invention positioned within a pipe fitting with the bimetal reed in its normal non-flexed position.
Figure 4:
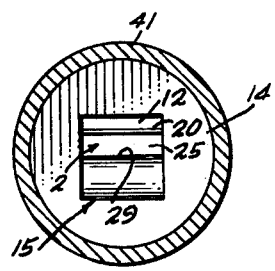
FIG. 4 is a cross-sectional view taken along section line 4—4 of FIG. 3.
Figure 5:
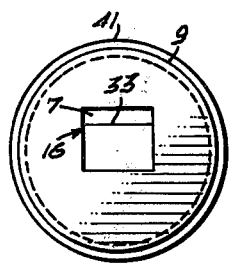
FIG. 5 is an end-view of the valve as shown in FIG. 3.

As shown in FIG. 2, the casing means 14 has formed therein a tubular, preferably rectangular duct 3 and further includes a partition wall 6 disposed in interrupting relationship within the duct 3 so as to define an upstream cavity 11 on one side and a downstream cavity 8 on the other side. On opposed longitudinal ends of the casing means 14, upstream cavity 11 has an upstream orifice 10 so as to define fluid inlet 12 and the downstream cavity 8 has a downstream orifice 13 so as to further define a fluid outlet 7. A passage 4 is integrally formed in the partition wall 6 to interconnect the upstream cavity 11 with the downstream cavity 8 for fluid flow therebetween. A thermosensitive reed means, preferably a bimetal reed 2 as illustrated in FIGS. 2 and 4 is positioned in the upstream cavity 11. The reed 2 has an attached portion 24 and an unattached portion 25 disposed upstream relative to the attached portion 24. In the preferred embodiment illustrated in the drawings, the partition wall 6 is disposed in angled traversing relationship relative to the duct 3 of the casing means 14. The unattached portion 25 of the reed 2 is secured at the furthermost downstream intersection of the angled partition wall 6 with the casing means 14. More specifically, the partition wall 6 and the casing means 14 defines an upstream cavity having a substantially V-shaped cross-section relative to a plane perpendicular to the longitudinal axis of the partition wall 6. This permits the bimetal reed 2 to be secured to the vertex 26 of the V-shaped upstream cavity 11.

The casing means 14 has a ledge 27 mounted adjacent to the unattached portion 25 in upstream fluid flow protecting disposition relative to the unattached portion 25, as will be described hereinafter. The passage 4 is disposed intermediate to the ledge 27 and the vertex 26 of the upstream cavity 11 relative to the longitudinal axis of the casing means 14.

Figure 3:
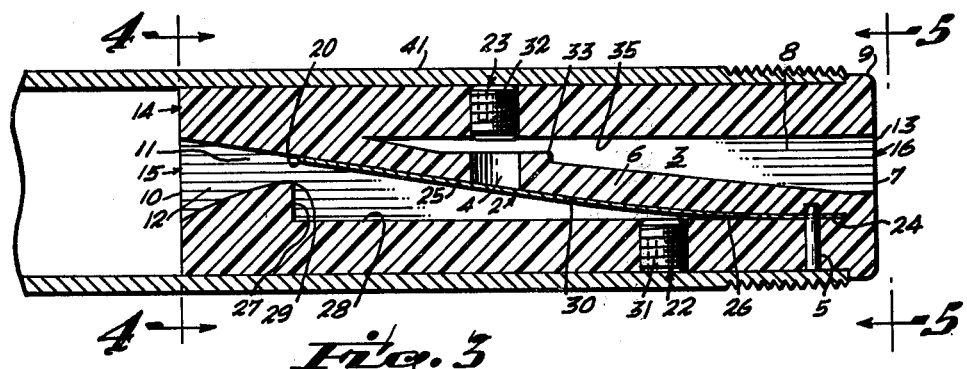
FIG. 3 is a cross-sectional view of the valve of the present invention positioned within a pipe fitting with the bimetal reed in its fluid restricting position.

In operation the bimetal reed 2 has a non-flexed normal position as depicted in FIG. 3, with the unattached portion 25 of the same disposed in non-interrupting fluid disposition when the temperature of the fluid is below a predetermined value. More specifically, in this position, the bimetal reed 2 is disposed in substantially flat, immediate adjacent relationship to the inner duct wall 28 of the casing means 14 within said upstream cavity 11. Ideally, the portion of the inner duct wall 28 which receives the bimetal reed 2 has a flat configuration for receiving the same in interfacing immediately adjacent relationship. When in this nonflexed normal position, the bimetal reed 2 is positioned downstream from the ledge so that the same prevents the fluid flow from lifting the unattached portion 25 upward.

As the temperature of the fluid flow increases, the unattached portion 25 of the reed 2 tends to flex upward. At a predetermined temperature, the bimetal reed will be flexed into a position defined as the flexed intermediate position wherein the ledge no longer protects the unattached portion 25 from the mainstream of fluid flow. More specifically, in the flexed intermediate position, the unattached portion 25 of the reed 2 will be spaced-apart from the inner duct wall 28 by a distance greater than the outer extremity 29 of ledge 27. Once this occurs, the unattached portion 25 is at least partially disposed in the mainstream and this occurs at the predetermined temperature valve. Generally, the flexed intermediate position is defined to include any position of the reed 2 extending above the ledge 27 but prior to engaging the partition wall 6, as described hereinafter to be the fluid restriction position.

As illustrated in FIGS. 2 and 4, once the reed 2 is disposed within the mainstream of the fluid flow and is therefore in its flexed intermediate position, the mainstream of fluid flow will engage the reed means and force it upward. The fluid flow will then place the reed 2 in a position defined as a fluid restriction position. It is in this position that the reed 2 substantially restricts the fluid flow by engaging the passage 4 of the partition wall 6. More specifically, the partition wall 6 is ideally formed with a substantially flat upstream facing surface for receiving innerfacing immediately adjacent relationship the reed 2 when in the fluid restriction position. In other words, the reed 2 will be pressed against the flat upstream facing surface 30 so as to restrict the passage 4.

Now a detailed description of the operation will be presented. Prior to the temperature water reaching the predetermined value, the determination of which will be discussed hereinafter, the combination of fluid inlet 12, upstream cavity 11, passage 4, and fluid outlet 7 provides an uninterrupted flow of fluid through the valve 1 as illustrated in FIG. 1. When operating as such, the bimetal reed 2 is in its non-interrupting fluid position so as not to be deflected away from the inner duct wall 28. As the temperature of the fluid flowing through the valve 1 increases, the change causes the bimetal reed 2 to flex upward at the unattached portion 25. This flexing upward into the cavity is the natural action of a bimetal strip when it is subjected to heat transfer contact with fluid having an increasing temperature gradient. The increasing temperature causes the bimetal reed 2 to raise further and further into the upstream cavity 11 until its upstream end 20 projects into the upstream orifice 10 of the upstream cavity 11. At this point it is defined to be in its flexed intermediate position. The force of the mainstream of fluid flow striking the underside of reed 2 presses or forces the entire unattached portion 25 of the reed 2 against the upstream facing surface 30 as shown in FIG. 3. The positioning of the bimetal reed 2 against the passage 4 substantially blocks the free flow of fluid from the cavity 11 to the cavity 8, and allows for only a slight leakage. Since the flange 9 on the downstream end of the valve 1 prohibits the flow of fluid around the valve, the closing of passage 4 by the reed 2 substantially restricts the passage of fluid, except for slow leakage.

An important feature of the present invention is its ability to automatically reset itself. Generally, as long as the pressure against the bimetal reed in its fluid restricting position remains the same, the reed 2 will remain in this position and continue the restriction of fluid flow, except for a slight leakage. Normally in the fluid delivery system, there will be some way to shut off the fluid pressure. For example, with the conventional shower in a typical home, there is one or two control valves for controlling water pressure. With this arrangement, it would be the standard practice to cut off the water pressure after the valve 1 had been activated to restrict the flow. Once the fluid flow has been shut off by the control knobs (not shown), the leakage as previously described would reduce the pressure of the fluid against the bimetal strip. This will allow the bimetal strip to return to its flexed intermediate position, and upon the temperature of the fluid flow dropping below the predetermined value, the bimetal strip would return to its non-interrupting fluid position. Since the fluid flow had a temperature exceeding the predetermined value on the prior attempt, it would be expected that the user would adjust the control knobs so as to obtain a mixed fluid having a lower temperature than previously tried. Assuming that the user has sufficiently reduced the temperature of the mixed fluid to a temperature below the pre-determined value, then a flow of such a temperature through the valve 1 would not result in any fluid restriction. However, it is necessary to contend with that fluid contained between the control knobs or valves and the valve 1. If the fluid caught therebetween has been sitting for a sufficient time to allow heat transfer to change the temperature of the same below the predetermined value, then there will be no problem on initiating the fluid flow by use of the control knobs. However, as would be the normal practice, one using a shower would wish to immediately attempt to obtain water through valve 1. By slowly increasing the fluid pressure by use of the control knobs or valves, the water between the valves and valve 1 will be slowly flushed from the system. The pressure of such a gradual increase will be insufficient to result in the reed 2 being repositioned in its fluid restricting position even if its fluid temperature is in excess of the pre-determined value. Once this fluid has been flushed, the full pressure of the fluid delivery system may be reestablished. It should be understood that the present invention is not limited in use to a shower system containing water. To the contrary, this system could be adapted to other fluid delivery systems. Moreover, although manual manipulation of the control valves of the conventional shower was described in the above example, this invention could be utilized with a system of non-manual control. Moreover, this valve 1 has application in a system where no fluid shut-off by control valves occurs, but sufficient leakage occurs to clear the fluid having a temperature in excess of the predetermined value or where sufficient time has passed in which heat transfer lowers the fluid temperature to below predetermined value. However, the invention is particularly applicable to a system where fluid shut-off by control valves occurs, and sufficient control provides for an immediate gradual increase in fluid pressure after the initial shut-off.

The setting the predetermined temperature has not previously been discussed. As shown in FIG. 2 such adjustment of the predetermined temperature is accomplished by the first adjustment screw 22 which protrudes through the casing means 14 and extends into the duct 3 a variable distance. More specifically, the first adjustable projection 22 comprises a first screw 31 disposed in threaded engagement with the casing means 14 whereby rotation of the first screw 31 varies the distance in which the same extends into the duct 3. The first screw 31 protrudes into the casing 14 to abuttingly engage the reed 2. This allows for the degree of flexing of the reed 2 required to reach the intermediate flexed position to be adjusted externally, and in turn varying the predetermined temperature.

The second adjustable projection 23, preferably in the form of a second screw 32, may be optionally provided for varying the fluid flow through passage 4. As shown in FIG. 2, the second screw 32 protrudes through the casing means 14 and extends into the duct 3 a variable distance. More specifically, the second screw 32 threadingly engages the casing means 14 whereby rotation of the second screw varies the distance in which the same extends into the duct 3. The screw 32 is cooperatively positioned in adjacent fluid flow limiting relationship to the passage 3. As shown in FIG. 2, the screw 32 is disposed in protruding relationship within the downstream cavity. The partition wall 6 includes an enlarged portion defining a ridge 33 positioned in the down stream cavity. The ridge is disposed in substantially spaced-apart parallel relationship to the adjacent duct wall 35 of the casing means 14. More specifically, the screw 32 is axially aligned with the passage 4.

The construction design of valve 1 is such that it meets the standards specified by ASTM F 444 and F 445 of the Standard Consumer Safety Specification for scald preventing devices and Standard Consumer Safety Specification for thermal shock prevention devices and provides solutions to the scald and thermal shock prevention needs as identified in the Consumer Product Safety Commission report "Aystenatic Program to Reduce the Incidence and Severity of Bathtub and Shower Area Injuries" (June 4, 1975 prepared by ABT Associates, Inc.).

These standards state that the scald preventing devices, or systems, or both, shall meet the following minimum requirements: (1) The maximum allowable temperature at the water outlet to the bathing area shall be 120° F (49° C). If the temperature at the water discharging from the water outlet of the devices or systems rises to 120° F, the flow shall automatically be reduced to 0.5 g/min in 5 seconds or less; (2) The devices, or systems, or both, shall be so constructed that when repair is required, it can be effected without disturbing the piping supply system; (3) Devices, or systems, or both, shall withstand, without damage or impairment of the performance capabilities, a supply pressure of 125 psi (862 kpa).

It is contemplated that the present invention will be positioned between a water temperature regulating valve, possibly manual, and the discharge outlet in the fluid delivering system. The most typical outlets for the purposes of illustration are shower heads and bathtub outlets. In the shower head example, the invention intervenes between the pipe (shower arm) installed in a shower to deliver the water to the shower head, and the shower head itself. More particularly this invention inserts within the shower arm at the shower head end and acts in its safety performing capacity to restrict the flow of water to the shower head at a predetermined temperature. The location and function of the invention as illustrated by the shower example is typical of the installation of the valve 1 in most other fluid delivering systems.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

METHOD

There is disclosed a method of restricting a supply of fluid in a fluid delivery system for the safety of the user of the same when the fluid temperature rises to a pre-determined value. The method comprises the steps of flowing a stream of fluid through a delivery system and positioning a thermoresponsive reed means 2 of a valve 1 in a non-interrupting fluid position within the fluid delivery system when the temperature of the fluid is below the predetermined value. Next, flexing the thermoresponsive reed means 2 into a flexed intermediate position of having an interacting relationship with the mainstream of fluid flow upon the temperature of the liquid reaching the pre-determined value. Subsequent to obtaining this position, yieldably engaging the thermoresponsive reed means with the interaction of the main stream of fluid flow to restrict the fluid flow. The step of yieldably engaging the thermoresponsive reed means 2 includes the step of using the mainstream of fluid flow for pressing the reed means 2 against a passage 4 of the valve 1 to partially seal the same to the fluid flow through the passage 4. The next step is decreasing the pressure of the fluid flow to reinstate the thermoresponsive reed means 2 to at least the flexed intermediate position. This step of decreasing the pressure to reinstate the reed means 2 includes the steps of cutting off the fluid flow downstream from the valve 1 and the step of then allowing leakage through the passage 4 of the valve 1. Also, after the step of cutting off the fluid flow downstream, the next step is to slowly increase the fluid flow of the valve 1 for flushing out the fluid between the point of cut-off and the thermosensitive reed means 2 while maintaining the same in at least its flexed intermediate position. As long as the temperature of the fluid remains above the predetermined temperature and the fluid pressure remains sufficiently low, the reed means 2 will return to the flexed intermediate position, but will not return to its non-interrupting fluid position. Should the fluid between the point of cut-off and the thermosensitive reed means 2 have sufficient time for the heat transfer to result in a fluid temperature less than the pre-determined temperature, then the thermosensitive reed means will return to its non-interrupting fluid position. Normally, the user of such a fluid system, such as in a conventional shower, would desire to increase the fluid flow shortly after cutting off the fluid downstream with shower handles normally found in a conventional shower. More specifically, upon having the valve 1 substantially restrict the flow of fluid to the extent of only allowing a slow leak, the user would then proceed to turn the shower knobs to cut the fluid flow off. This in turn would result in the lessening of the fluid pressure between the cut-off point and the reed means 2, due to the leakage from the valve 1, as previously explained. Once having done this, the user would adjust the mixture of waters so there would be less hot water mixed therein, giving a lower temperature. At this point the user would want to slowly increase the fluid flow, flushing out the fluid which in all likelihood would remain at a temperature above the predetermined temperature. The slow increase of fluid flow will allow the flushing of the same through the pipe without the reed means 2 entering into its fluid restricting position. If the user has not sufficiently adjusted the hot water in the illustrative shower example, then upon increasing the pressure to normal usage, the valve 1 will once again restrict the fluid flow therethrough. This results in the user having to repeat the above steps again until a temperature of the fluid flow obtained by mixing hot fluid with cold fluid is less than the predetermined temperature. Although a shower with conventional shower handles for controlling the mixture of hot water with cold water is given as an illustrative example of the utilization of the valve 1 above, it is contemplated that applicant's invention can be utilized with other fluid delivery systems. Additionally, in the shower example, manual control of the shower handles was contemplated. However, in other fluid delivery systems, automatic feed back systems involving no manual control might be implemented. Additionally, as previously explained, if sufficient heat transfer has occured between the fluid between the cut-off point and the reed means 2, flushing of the same may be made unnecessary. In this case, the step of gradually increasing the fluid pressure would be unnecessary. However, when this system is applied to a conventional shower, it would be a normal practice and advantageous feature of this invention to slowly increase the fluid flow in that the time for the above described heat transfer would be too long for the normal user. Whether or not heat transfer occurs, it is necessary for some leakage to occur through the passage 4, in that it is necessary to reduce the fluid pressure so that the reed means 2 will return to at least its flexed, intermediate position.

Also there is the step of adjusting the thermoresponsive reed means 2 relationship to the mainstream of fluid flow when in its non-interrupting position to vary the predetermined temperature. Additionally, to conserve and reduce the fluid flow, there is additional optional step of adjusting the duct or passage area of the fluid delivery system to limit the fluid flow.

What is claimed is:

1. A thermosensitive safety valve for cutting off a supply of fluid, comprising:
   casing means having formed therein a duct with said duct having an upstream fluid inlet and a downstream fluid outlet,
   said casing means having an interiorly disposed partition wall interposed within said duct to define an upstream cavity and a downstream cavity,
   a passage formed within said partition wall for fluid transfer between said upstream cavity to said downstream cavity,
   thermoresponsive reed means positioned in said upstream cavity having an attached portion and an unattached portion disposed upstream relative to said attached portion,
   said casing means having a ledge positioned adjacent said unattached portion in upstream fluid flow protecting disposition relative to said unattached portion,
   said thermoresponsive reed means having a non-flexed normal position with said unattached portion of the same disposed in non-interrupting fluid position when the temperature of the fluid is below a predetermined value,
   said thermoresponsive reed means disposed in adjacent relationship to the inner duct wall of said casing means within said upstream cavity when in said non-flexed normal position whereby said ledge prevents the fluid flow from lifting said unattached portion,
   said thermoresponsive reed means having a flexed intermediate position with said unattached portion of the same at least partially disposed within the main stream of fluid flow passing through said upstream fluid inlet upon the temperature of the fluid reaching the predetermined valve,
   said unattached portion spaced apart from the inner duct wall of said casing means by a distance greater than the outer extremity of said ledge when in said flexed intermediate position whereby said ledge no longer protects said unattached portion from the main stream of fluid flow,
   said thermoresponsive reed means having a fluid restricting position with the unattached portion of the same disposed in partially sealing engagement with said passage of said partition wall upon interaction of said unattached portion with the main stream of fluid flow.

2. The thermosensitive safety valve of claim 1,
   said partition wall disposed in angled traversing relationship relative to said duct of said casing means,
   said unattached portion of said thermoresponsive reed means secured at the furthermost downstream intersection of said angled partition wall with said casing means.

3. The thermosensitive safety valve of claim 2,
   a portion of the inner duct wall of said casing means within said upstream cavity having a flat configuration for receiving in interfacing immediately adjacent relationship said thermoresponsive reed means when in its non-flexed normal position,
   said partition wall having a substantially flat upstream facing surface for receiving in interfacing immediately adjacent relationship said thermoresponsive reed means when in said fluid shut off position.

4. The thermosensitive safety valve of claim 3,
   said partition wall and said casing means defining said upstream cavity to have a substantially V-shaped cross-section relative to a plane perpendicular to the longitudinal axis of said partition wall,
   said thermoresponsive reed means having said attached portion disposed in the vertex of said V-shaped upstream cavity,
   said passage disposed intermediate between ledge and said vertex relative to the longitudinal axis of said casing means, whereby said thermoresponsive reed means may be flexed outward to be pressed against said flat upstream facing surface of said partition wall so as to close said passage.

5. The thermosensitive safety valve of claim 1, a first adjustable projection protruding through said casing means and extending into said duct a variable distance, said first adjustable projection disposed for abutting engagement with said thermoresponsive reed means, whereby the degree of flexing of said thermoresponsive reed means required to reach said intermediate flexed position may be externally adjusted and thereby varying said predetermined temperature.

6. The thermosensitive safety valve of claim 5, said first adjustable projection comprising a first screw disposed in threaded engagement with said casing means whereby rotation of the said first screw varies the distance in which the same extends into said duct.

7. The thermosensitive safety valve of claim 1, an adjustable projection protruding through said casing means and extending into said duct a variable distance, said adjustable projection cooperatively positioned in adjacent fluid flow limiting relationship to said passage, whereby externally adjusting the distance said adjustable means extends within said duct varies the fluid flow through said passage.

8. The thermosensitive safety valve of claim 7, said adjustable projection comprising a screw disposed in threaded engagement with said casing means whereby rotation of the said screw varies the distance in which the same extends into said duct.

9. The thermosensitive safety valve of claim 7, said adjustable projection disposed in protruding relationship within said downstream cavity, said partition wall including an enlarged portion defining a ridge disposed within said downstream cavity, said ridge having a surface disposed in surrounding relationship to said passage, said surface being disposed in substantially spaced apart parallel relationship to the adjacent said duct wall of said casing means.

10. The thermosensitive safety valve of claim 7, said adjustable projection axially aligned with said passage.

11. The thermosensitive safety valve of claim 1, an exterior flange disposed in surrounding relationship at the downstream end of said casing means whereby a seal is created between the exterior of said casing means and a fluid delivery system.

12. The thermosensitive safety valve of claim 1, said thermoresponsive reed means comprising a bimetal strip.

* * * * *